(12) United States Patent
Yuan (10) Patent No.: US 8,562,765 B2
(45) Date of Patent: Oct. 22, 2013

(54) PROCESS FOR HEAT TREATING METAL POWDER AND PRODUCTS MADE FROM THE SAME

(75) Inventor: Shi Yuan, Westford, MA (US)

(73) Assignee: Global Advanced Metals, USA, Inc., Waltham, MA (US)

( * ) Notice: Subject to any disclaimer, the term of this patent is extended or adjusted under 35 U.S.C. 154(b) by 418 days.

(21) Appl. No.: 12/785,742

(22) Filed: May 24, 2010

(65) Prior Publication Data

US 2010/0233013 A1    Sep. 16, 2010

Related U.S. Application Data

(63) Continuation of application No. 11/141,685, filed on May 31, 2005, now abandoned.

(51) Int. Cl.
*B22F 1/00* (2006.01)
(52) U.S. Cl.
USPC .......................................... 148/513; 148/565
(58) Field of Classification Search
USPC ........ 75/252; 29/25.03; 148/513, 565; 419/38
See application file for complete search history.

(56) References Cited

U.S. PATENT DOCUMENTS

| | | | |
|---|---|---|---|
| 5,184,286 A | | 2/1993 | Lauf et al. |
| 5,397,530 A | | 3/1995 | Narasimhan et al. |
| 5,772,701 A | * | 6/1998 | McMillan et al. ........... 29/25.03 |
| 6,004,505 A | | 12/1999 | Roy et al. |
| 6,183,689 B1 | | 2/2001 | Roy et al. |
| 6,322,912 B1 | | 11/2001 | Fife |
| 6,576,038 B1 | | 6/2003 | Rao |
| 2002/0112794 A1 | | 8/2002 | Sethuram et al. |
| 2002/0152842 A1 | * | 10/2002 | Oda et al. .......................... 75/252 |
| 2003/0172772 A1 | | 9/2003 | Sethuram et al. |

FOREIGN PATENT DOCUMENTS

| | | |
|---|---|---|
| EP | 0532658 B1 | 9/1997 |
| EP | 1 207 556 A2 | 5/2002 |
| JP | 04314822 A | 11/1992 |
| JP | 2944211 B2 | 6/1999 |
| JP | 2000103608 A | 4/2000 |
| JP | 2002-206105 | 7/2002 |
| KR | 10-2001-0052388 | 6/2001 |
| WO | WO 00/56486 | 9/2000 |

OTHER PUBLICATIONS

English translation of Notice of Preliminary Rejection, dated Jul. 20, 2012, in KR Patent Application No. 10-2007-7030680, issued by the Korean Intellectual Property Office (3 pages).
Li et al., "The effects of hydroxide gel drying on the characteristics of co-precipitated zirconia-hafnia powders," Journal of Materials Science, 28, 1993, pp. 553-560.
Gu et al., "Research on the Microwave Modification of Diatomite," Journal of Sichuan University (Engineering Science Edition), vol. 36, No. 6, Nov. 2004, pp. 43-47 (Abstract in English).
International Search Report and Written Opinion of the International Searching Authority for PCT/US2006/019353 dated Oct. 5, 2006.

(Continued)

*Primary Examiner* — Weiping Zhu
(74) *Attorney, Agent, or Firm* — Kilyk & Bowersox, P.L.L.C.

(57) ABSTRACT

A method of heat treating metal powder and/or metal oxide powder by microwave energy is described. Furthermore, products made by the various processes of the present invention are further described.

11 Claims, 6 Drawing Sheets

Schematic of Setup for Microwave Heat-treatment (56) References Cited

OTHER PUBLICATIONS

"About the 1996 TMS Annual Meeting: Wednesday Morning Sessions (Feb. 7), Tantalum: Applications: Session V," 1996 TMS Annual Meeting, Feb. 4-8, 1996, Anaheim, California (4 pages).

McMillan et al., "Microwave Processing of Tantalum Capacitors," CRADA Final Report, Mar. 1, 1998 (12 pages).

English translation of Office Action issued by Japan Patent Office in corresponding Japanese Patent Application No. 2008-514680 dated May 8, 2012 (3 pages).

English translation of Third Office Action received in corresponding Chinese Patent Application No. 200680019062.0 received Jul. 19, 2010 (5 pages).

English translation of D4, "Preparation and Properties of 16V-22000 Tantalum Powder," Luntao Pan, Rare Metal(s) and Hard Alloy, vol. 101, Jun. 1990, p. 28 and 29 (2 pages).

English translation of Notice of Reasons for Rejection issued by the Japanese Patent Office, mailed Aug. 14, 2012, for corresponding Japanese Patent Application No. 2008-514680 (3 pages).

English translation of Notice of Last Preliminary Rejection (Non-Final), dated Feb. 21, 2013, in KR Patent Application No. 10-2007-7030680, issued by the Korean Intellectual Property Office (2 pages).

\* cited by examiner

Fig. 1 Schematic of Setup for Microwave Heat-treatment

Fig. 2 SEM microphotograph of a tantalum powder with standard vacuum heat-treatment (top one) and with microwave heating (bottom one).

Fig. 3 Microwave power and powder temperature during microwave heating

Fig. 4 DC Leakage vs. Forming Voltage for Commercial C350 and Ta Powder Processed with Microwave-heating Fig. 5 Capacitance vs. Forming voltage for Commercial C350 and Ta Powder Processed with Microwave-heating Fig. 6 Accumulated intrusion volume of anodes produced from microwave-heated powder

PROCESS FOR HEAT TREATING METAL POWDER AND PRODUCTS MADE FROM THE SAME

This application is a continuation of U.S. patent application Ser. No. 11/141,685, filed May 31, 2005, and is incorporated in its entirety by reference herein.

BACKGROUND OF THE INVENTION

The present invention relates to metal powder and metal oxide powders, such as powders used for capacitor anodes. The present invention further relates to methods to heat treat the metal powder and metal oxide powders.

Among its many applications, metal powder, such as tantalum powder, is generally used to produce capacitor electrodes.

Tantalum capacitor electrodes, in particular, have been a major contributor to the miniaturization of electronic circuits. Such capacitor electrodes typically are manufactured by compressing agglomerated tantalum powder to less than half of the metal's true density with an electrode lead wire to form a pellet, sintering the pellet in a furnace to form a porous body (i.e., an electrode), and then subjecting the porous body to anodization in a suitable electrolyte to form a continuous dielectric oxide film on the sintered body. The anodized porous body is then impregnated with a cathode material, connected to a cathode lead wire and encapsulated.

The primary particle size and the agglomerated size (agglomerates are clusters of smaller primary particles), and the primary particle and agglomerated size distributions of a powder, are important factors in the efficiency and efficacy of the subsequent sintering process by which porous bodies are made therefrom and in the electrical characteristics of the functional products, such as electrolytic capacitors, in which such porous bodies are incorporated.

In attempts to achieve a tantalum metal powder having the desirable characteristics for making capacitor electrodes and similar products, powders were limited by the processes by which they were produced. Currently, for example, tantalum powders are generally produced via one of two methods: a mechanical process or a chemical process. The mechanical process includes the steps of electron beam melting of tantalum to form an ingot, hydriding the ingot, milling the hydride, and then dehydriding, crushing, and heat treating. This process generally produces powder with high purity, which is used in capacitor applications where high voltage or high reliability is required. The mechanical process suffers, however, from high production costs. In addition, tantalum powders produced by the mechanical process generally have low surface area.

The other generally utilized process for producing tantalum powder is a chemical process. Several chemical methods for producing tantalum powders suitable for use in capacitors are known in the art. U.S. Pat. No. 4,067,736, issued to Vartanian, and U.S. Pat. No. 4,149,876, issued to Rerat, relates to the chemical production process involving sodium reduction of potassium fluorotantalate ($K_2TaF_7$). A review of typical techniques is also described in the background sections of U.S. Pat. No. 4,684,399, issued to Bergman et al., and U.S. Pat. No. 5,234,491, issued to Chang. All patents are incorporated in their entirety by reference herein.

Tantalum powders produced by chemical methods are well-suited for use in capacitors because they generally have larger surface areas than powders produced by mechanical methods. The chemical methods generally involve the chemical reduction of a tantalum compound with a reducing agent. Typical reducing agents include hydrogen and active metals such as sodium, potassium, magnesium, and calcium. Typical tantalum compounds include, but are not limited to, potassium fluorotantalate ($K_2TaF_7$), sodium fluorotantalate ($Na_2TaF_7$), tantalum pentachloride ($TaCl_5$), tantalum pentafluoride ($TaF_5$), and mixtures thereof. The most prevalent chemical process is the reduction of $K_2TaF_7$ with liquid sodium.

The chemically reduced powder is referred to as "basic lot powder" and typically comprises agglomerates or clusters of smaller primary tantalum particles. These clusters or agglomerates are referred to herein as "basic lot agglomerates." The primary particle sizes of these basic lot agglomerates generally range from about 0.1 to about 5 microns in size. The basic lot agglomerate size distribution of basic lot powders is typically polydispersed and substantially-bimodal. The term "polydispersed" means a broad distribution with a wide range of values and "bimodal" means a distribution with two modes (i.e., there are two different values which are conspicuously more frequent than neighboring values).

Basic lot powder is typically heat treated, milled, or crushed, and deoxidized such as by reaction with magnesium. The resultant product, sometimes referred to herein as a "heat treated and deoxidized powder" or "finished powder" typically includes some agglomerates, which may be referred to herein as "heat treated and deoxidized agglomerates."

Products of this type may be compressed and sintered to make porous bodies, such as anodes for capacitors. Capacitor electrodes produced from such heat treated and deoxidized powders of tantalum, however, suffer from non-uniform sintering and variable porosity distributions.

The resultant surface area of a finished tantalum powder is an important factor in the production of capacitors. The charge capability (CV) of a tantalum (for example) capacitor (typically measured as microfarad-volts) is directly related to the total surface area of the anode after sintering and anodization. Capacitors having high surface area anodes are desirable because the greater the surface area, the greater the charge capacity of the capacitor. Greater net surface area can be achieved, of course, by increasing the quantity (grams) of powder per pellet. One way to accomplish this is by pressing larger amounts of tantalum powder to form the porous pellet before sintering. This approach is restricted, however, because there is an inherent limit to the amount of powder which can be compacted into a given pellet size. Pellets pressed with higher than usual compression ratios result in anodes having poor porosity distributions with closed and non-uniform pores. Open, uniform pores are important for the steps of anodizing and impregnating the pellet to form the cathode.

As an alternative to increasing the quantity of tantalum powder used to produce the pellet, development efforts have focused on finding tantalum powders having higher specific surface areas. By increasing the specific surface area of these powders, higher surface area anodes having higher capacitance can be achieved while using smaller amounts of the tantalum powders. These higher capacitance values are typically measured based upon the volume of pellet produced (i.e., CV/cc). As a result, by using high surface area tantalum powders, capacitor sizes can be reduced while achieving the same level of capacitance. Alternatively, a larger capacitance can be achieved for a given capacitor size.

Generally, heat treating of the metal powder occurs in a vacuum furnace. This type of heat treatment is commonly used in the industry. There has not been much improvement in the area of how to heat treat metal powders. While other areas of metal powder preparation and capacitor anode preparation have been examined and altered, there has not been much emphasis in trying to improve the manner in which powders are heat treated.

SUMMARY OF THE PRESENT INVENTION

A feature of the present invention is to provide a method to heat treat metal powders or metal oxide powders other than by subjecting the metal powders to a furnace.

Another feature of the present invention is to provide a way to increase the capacitance capability of metal powders or metal oxide powders.

A further feature of the present invention is to provide a more energy efficient way to heat treat metal powders or metal oxide powders.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method of making metal or metal oxide powders comprising heat treating the powder by microwave energy to form a heat-treated metal or metal oxide powder.

The present invention further relates to heat-treated metal or metal oxide powder formed by the processes of the present invention.

Also, the present invention relates to a method to increase the capacitance capability of metal powder or metal oxide powder comprising heat treating the metal powder or metal oxide powder by microwave energy.

The present invention, in addition, relates to altering the pore structure of the metal or metal oxide powder by heat treating the powder with microwave energy.

The present invention also relates to incorporating the method of heat treatment according to the present invention in a variety of processes to prepare powders, anodes, and/or capacitors.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

The present invention relates to metal powders and metal oxide powders heat-treated by microwave energy. The present invention further relates to methods of heat treating metal powders and metal oxide powders by microwave energy.

It is to be understood for purposes of the present invention that the preferred embodiment, metal powders, will be referenced but it is to be understood that the present invention applies to metal powders, metal oxide powders, nitride versions of the metal powders and metal oxide powders, metal alloy powders, and the like. One or more dopants can be present. Examples of metal powders include, but are not limited to, refractory metals, valve metals, metal oxides, such as conductive metal oxides, valve metal oxides, and the like. Specific examples include, but are not limited to, tantalum, niobium, tantalum oxide, niobium oxide, titanium, titanium oxide, aluminum, zirconium, hafnium, and other valve metals and their oxides. More specific examples include, but are not limited to, Ta, Nb, NbO, $NbO_{0.7}$, $NbO_{1.1}$, $Nb_2O_5$, $Ta_2O_5$, and any oxides between Ta and $Ta_2O_5$ and any oxides between Nb and $Nb_2O_5$. Specific examples of metals and metal oxides can also be found in U.S. Pat. Nos. 6,322,912; 6,338,816; 6,373,685; 6,375,704; 6,402,066; 6,788,525; 6,706,240; 6,689,187; 6,562,097; 6,348,113; and 6,338,832, all incorporated in their entirety by reference herein.

The metal powders and metal oxide powders that can benefit from the present invention can have any metal purity, any BET surface area, any D50 size, any D10 size, any D90 size, any Fisher sub sieve size, any particle size or pore size distribution, any Scott density, any particle size, any pre-agglomerate size, any pore size, any capacitance capability, any DC leakage capability, and the like. For instance, the metal or conductive metal oxide powder, such as tantalum powder, niobium powder, or conductive niobium oxide powder, can have one or more of the following ranges of various properties:

BET: 0.1 to 12.0 $m^2/g$
Scott density: 15 to 40 $g/inch^3$
Particle size as determined by SEM: 0.02 to 10 μm
Fisher sub sieve size: 0.15 to 10 μm
Capacitance capability: up to 300,000 CV/g at 10 volt formation, 90° C., 1200° C. sintering for 10 minutes
DC leakage: less than 2 nA/CV.

The non-conductive metal oxide powders can have one or more of the above properties except the capacitance or leakage properties.

In the present invention, metal powder or metal oxide powder is heat-treated by microwave energy. Heat treating of the powder occurs in the powder form. In other words, the powder is generally a flowable powder and not a compressed or sintered body of powder. The powder can be in any shape or size. For instance, the powder can be nodular, spherical, flake, fibrous, and any combination thereof. The metal powder or metal oxide powder that is heat-treated can be in a pre-agglomerated form or an un-agglomerated form. The pre-agglomerated powder, prior to being subjected to heat-treatment, can be agglomerated in any fashion, such as by a dry agglomeration, wet agglomeration, or the like. Examples of wet agglomeration include those discussed in U.S. Pat. No. 6,576,038, which is incorporated in its entirety by reference herein. The particles can have any agglomerate size, such as from about 30 to 300 μm.

Figure 1:
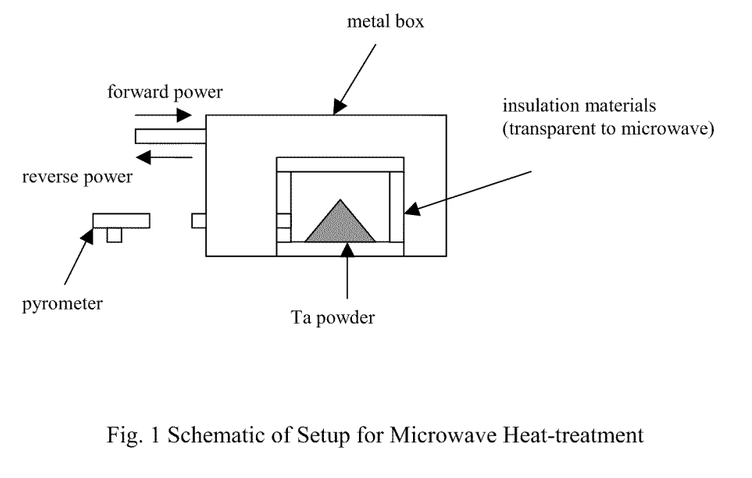
FIG. 1 is a general setup which can be used to heat treat the metal or metal oxide powder, such as tantalum powder, by microwave energy.

The powder, which is subjected to heat treatment by microwave energy, can be done in any apparatus, such as an enclosed container wherein the powder can rest on a substrate, such as a tray or plate. FIG. 1 provides one example of a setup wherein the powder can be subjected to heat treatment by microwave energy. As shown in FIG. 1, a metal box can be used in order to contain the microwave energy, and insulation materials to reduce radiation heat loss, such as porous alumina silica based materials, can form an enclosed area wherein the metal powder or metal oxide powder can be placed. Those skilled in the art will readily know the type of apparatus and setup needed to subject a material to microwave energy. For instance, the heat treating of the powder can be achieved on a continuous basis, on a semi-continuous basis, or by batch. The heat treating of the powder can occur on a conveyor belt or similar transporting device through a microwave energy zone. The heat treating of the powder can occur all at once or can occur in various stages of being subjected to microwave energy. Also, the heat treating can be partially achieved with microwave energy and also in combination achieved with other heat treating techniques, such as with the use of a furnace. For purposes of the present invention, at least a portion of heat treatment uses microwave energy. Preferably, all of the heat treatment is achieved by microwave energy. Furthermore, various levels of microwave energy can be used throughout the heat treatment. For instance, a lower level of microwave energy can initially be used and then the microwave energy can gradually be raised to a higher level. In the alternative, one can start out with high microwave energy and lower the microwave energy over time. Any combination of one or more energy levels with respect to the microwave energy can be used to achieve the heat treatment of the powder. Specific examples of microwave devices include, but are not limited to, Autowave system by Communication and Process Industries, Inc. The metal powder can be subjected to any level of microwave energy and the amount and duration of the microwave energy can be an amount used to cause heat treatment of the metal or metal oxide powder such that afterwards the heat-treated metal powder or metal oxide powder can be crushed and/or milled in order to obtain agglomerated powder also known as a finished lot. The typical size of the powder after being crushed and/or milled (or otherwise reduced to powder form) is generally less than 425 microns. Examples of suitable microwave energy include from about 0.5 GHz to about 10 GHz or more. More preferred energy levels include from about 0.5 w to about 10 kw. The duration of the heat treatment can be from about 5 minutes to about 3 hours or more, and more preferably from about 10 minutes to about 2 hours. Any amount of time can be used to achieve the desired heat-treatment depending on the energy levels used.

Upon heat treatment by microwave energy, the heat-treated powder is in a state wherein the powder can be crushed or milled to reduce the powder to agglomerated particles. Thus, the powder, after heat treatment, is crushable and/or millable (or otherwise reducible to powder form) to the point where it can be agglomerated powder.

As an option, the heat-treated powder can then be subjected to a deoxidizing step in order to remove any amount of oxygen. The deoxidation step can occur using conventional techniques, such as using getter material like magnesium. Any deoxidation technique can be used. The powder can also be subjected to acid leaching using conventional techniques. The various processes described in U.S. Pat. Nos. 6,312,642 and 5,993,513 can be used herein and are incorporated in their entireties by references herein.

The heat-treated powder can also be compressed or pressed to make a pressed body. The pressing of the heat-treated powder can be achieved by any conventional techniques such as placing the heat-treated powder in a mold and subjecting the powder to a compression by use of a press, for instance, to form a pressed body or green body. Various press densities can be used, and include, but are not limited to, from about 1.0 to about 7.5 g/cm$^3$.

The heat-treated powder can also be sintered to make a sintered body. The sintering of the heat-treated powder can be achieved using any conventional techniques including the use of a furnace or additional microwave energy. The time and temperature of the sintering can be any amount typically used for the sintering of that particular heat-treated powder such as from about 5 min to about 120 min at peak temperature with respect to tantalum and from about 5 to about 120 min with respect to niobium. The sintering times for these materials can be any suitable times, such as from about 2 min to about 3 hours.

The sintered body can be anodized and/or impregnated with an electrolyte in any conventional manner. For instance, the anodizing and impregnation techniques described in U.S. Pat. Nos. 6,870,727; 6,849,292; 6,813,140; 6,699,767; 6,643,121; 4,945,452; 6,896,782; 6,804,109; 5,837,121; 5,935,408; 6,072,694; 6,136,176; 6,162,345; and 6,191,013 can be used herein and these patents are incorporated in their entirety by reference herein.

The heat-treated metal powder can be subjected to conventional nitriding prior to heat treatment, during the heat treatment by microwave energy, and/or after heat treating of the powder. The nitriding can be achieved by, for instance, the techniques mentioned in U.S. Pat. Nos. 5,448,447 and 6,679,934, incorporated in their entirety by reference herein.

The present invention further relates to the heat-treated powder formed by the processes of the present invention. Typically, the heat-treated powder can have one or more of the above-described physical or electrical properties. However, the present inventor has discovered that by heat treating the powder by microwave energy, the capacitance has a higher capacitance capability when compared to the same powder that is heat treated by the conventional means which is by a vacuum furnace. The increase in capacitance capability can be on the order of 5% or more, such as from about 10% to about 30%, again, compared to the same powder heat treated by a furnace and with all other preparation techniques being the same. The other physical properties of the powder (such as flow, −325 mesh particle size, and/or bulk density) compared to furnace heat treatment remain the same or about the same (such as within 20% or within 10%).

Also, with the present invention, the bulk densification of the heat-treated powder of the present invention can be less, such as 50% or less after heat-treatment and its surface area measured by BET technique is 10% to 150% or higher, preferably 25% to 100%, and more preferably, is more than 50% higher than that of the same valve metal powder (e.g., tantalum) except heat-treated by the traditional vacuum heat-treatment with the same thermal history. This lower centrifuged bulk densification provides a more porous capability upon the heat-treated powder being pressed and sintered to form an anode body. The porosity can be 80% or more of the theoretical density of tantalum metal, more preferably from 85% to 98%. The advantages and properties above apply equal to valve metals and oxides thereof including niobium and niobium oxides.

The present invention will be further clarified by the following examples, which are intended to be exemplary of the present invention. Scott Density was determined according to ASTM B329-98 (2003). Screen analysis was determined according to ASTM B 214-99. Flow was based on the flow test method described in U.S. Pat. No. 6,479,012, incorporated in its entirety by reference herein.

EXAMPLES 700 grams of sodium-reduced Ta powder having a 1.0 µm FSSS was used. The properties of this material are shown in Table I. The sample was doped with 50 ppm P. The heat-treatment was conducted in Autowave system by Communication and Power Industries, Inc.

TABLE I

Properties of Starting materials for microwave heating

| | |
|---|---|
| BET (m²/g) | 0.971 |
| Fisher (µm) | 1.02 |
| Scott Density (g/cm³) | 19.3 |
| C (ppm) | 24 |
| O (ppm) | 2823 |
| N (ppm) | 58 |
| Cr (ppm) | 5 |
| Fe (ppm) | 5 |
| Mg (ppm) | <1 |
| K (ppm) | 11 |
| Ni (ppm) | 17 |
| Na (ppm) | 2 |

As shown in FIG. 1, the microwave chamber was a cylinder with 30 inch diameter and 50 inch length. The container that holds the Ta powder was a porous alumina-based insulation material and was transparent to microwave energy. The thickness of the wall was about 2.5 cm. The top and bottom cover for the container was 5 cm in thickness. The bottom of the container was covered by a Ta foil of 0.005 inch in thickness to reduce contamination of insulation materials. The temperature was measured by a pyrometer through an observation hole about 8.5 cm from the base. The Ta powder was piled up in cone shape. The peak of Ta powder was about 2 cm above the center of the hole.

Figure 2:
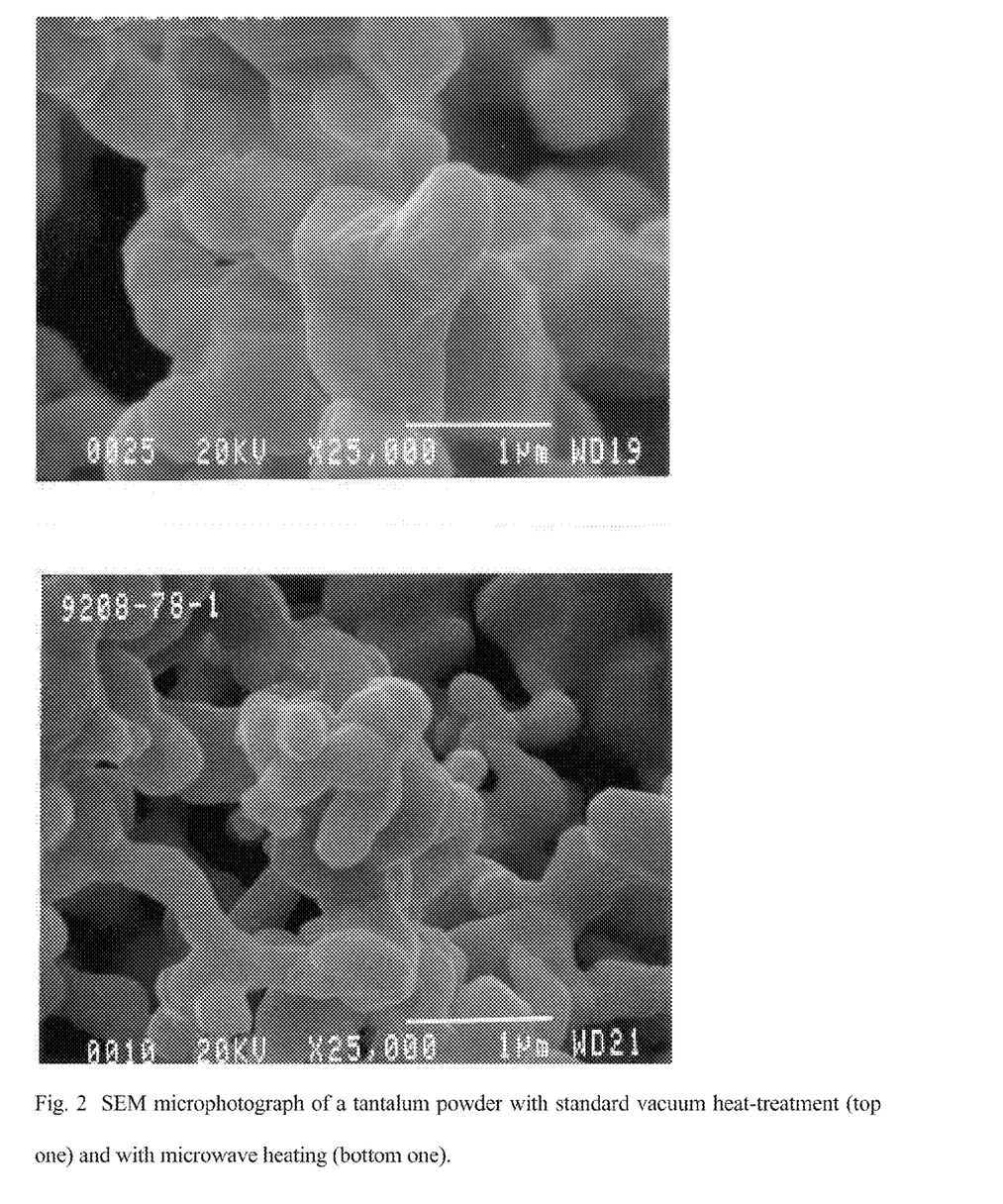
FIG. 2 is a microphotograph of a tantalum powder which has been heat treated by microwave energy.
Figure 3:
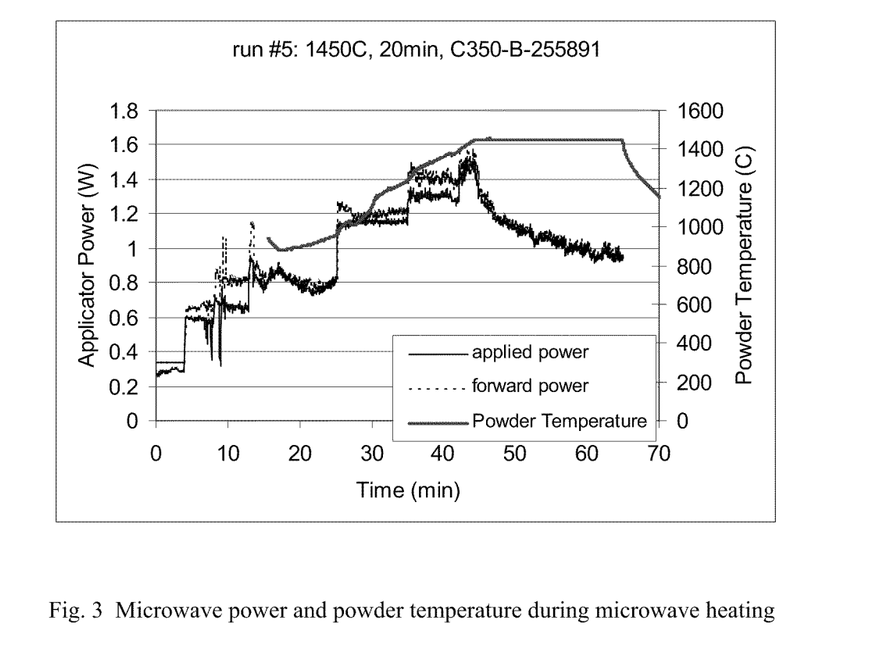
FIG. 3 is a graph comparing the temperature of the tantalum powder subjected to heat treatment by microwave energy over time.
Figure 4:
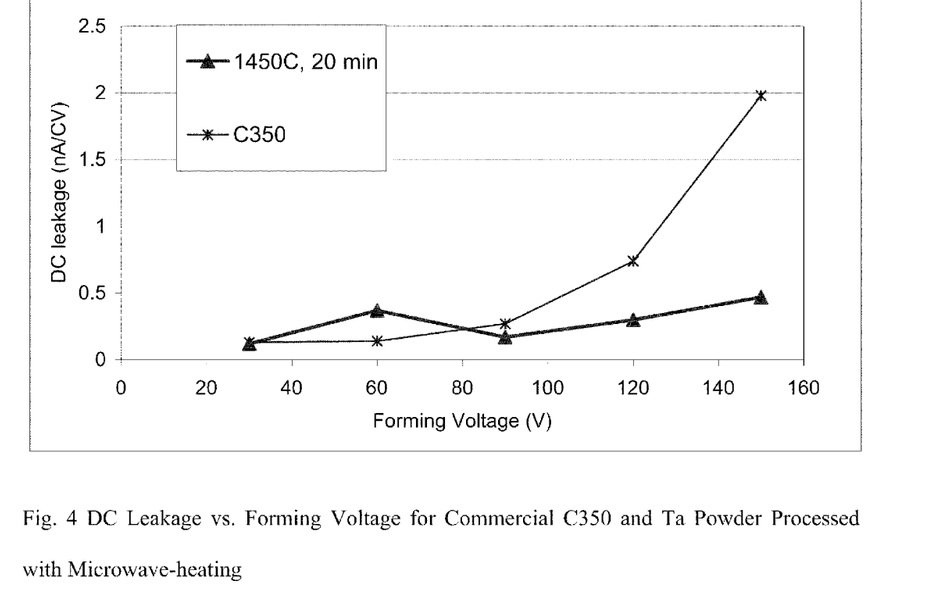
FIG. 4 is a graph showing the capacitance achieved by tantalum powder heat-treated by microwave energy over a variety of formation voltages.
Figure 5:
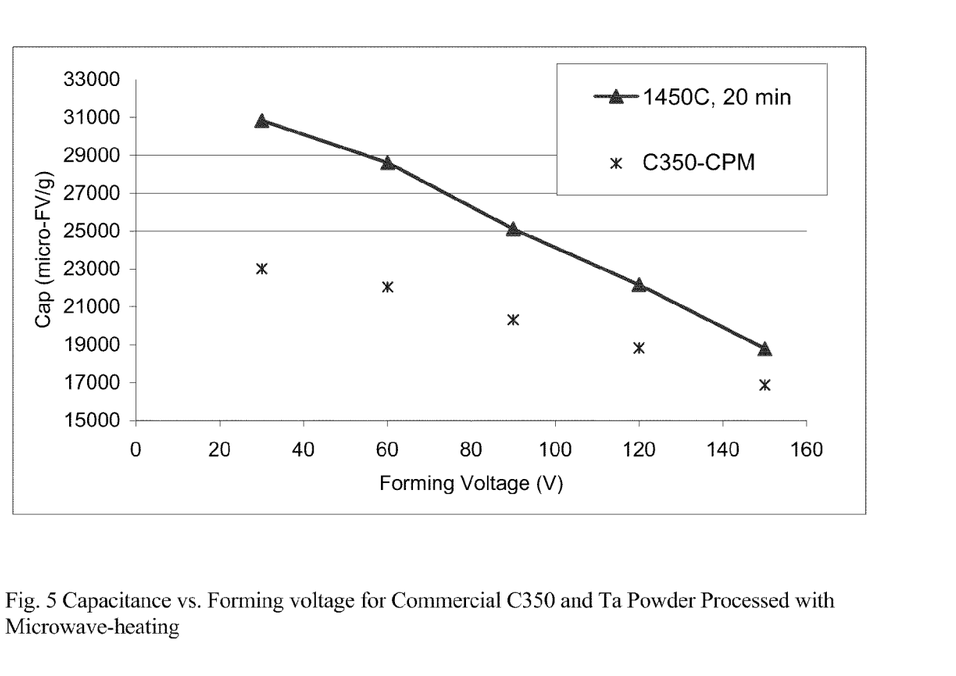
FIG. 5 is a graph of the same tantalum powder showing the DC leakage of the tantalum powder when formed into an anode over a variety of formation voltages.

The furnace was pumped down to less than 1 torr. The power of the furnace was then ramped up according to the profile shown in FIG. 2. The waveguide was slightly adjusted to reduce reverse power to a minimum. Typically, the reverse power was less than 10%. After the powder reach a temperature of 1450° C., it was held at that temperature for 30 min, and the power was then reduced to cool the powder. The power and temperature profile is plotted in FIG. 3.

After the powder cooled to room temperature, passivation was conducted to add a layer of oxide on the Ta surface to prevent the powder from burning. The powder was taken out and processed using standard procedures, such as milling, screening, deoxidation with Mg condition to reduce the oxygen level from larger than 4000 ppm to about 2000 ppm, leaching and drying following the standard industry procedures.

The physical and chemistry properties of the sample made as above are listed in Table II compared with Cabot's C350 Ta powder.

TABLE II

Comparison between microwave-heated C350 and commercial C350

| condition | microwave heated | commercial C350 |
|---|---|---|
| Fisher (µm) | 2.35 | 3 |
| Scott Density (g/cm³) | 27.1 | 28 |
| BET (m²/g) | 0.73 | 0.35 |
| Flow (mg/s) | 103 | 155 |
| C (ppm) | 66 | 14 |
| O (ppm) | 2026 | 1296 |
| N (ppm) | 2148 | 65 |
| H (ppm) | 39 | 24 |
| K (ppm) | 1 | 5 |
| Na (ppm) | 2 | 2 |
| P (ppm) | 25 | 55 |
| −325 mesh (%) | 35.9 | 37 |

Without lubricant, the sample was pressed to a cylindrical shape anode with 0.15 inch in diameter, 0.1088 inch in length and 5.25 g/cm³ in density. The anode was sintered under vacuum at 1480° C. for 15 min. After sintering, the anode was cooled and passivated following industry standards. The sintered anode was anodized in 0.1% H3PO4 solution with a conductivity of 4.3 mmho at 85° C., and with 75 mA/g current density and held for 120 min after target voltage was reached. The capacitance was measured in 18% H2SO4 solution and DC leakage was measured in 10% H3PO4 solution with 70% of formation voltage. The anodization was done at 30, 60, 90, 120 and 150V at about 85° C.

Figure 6:
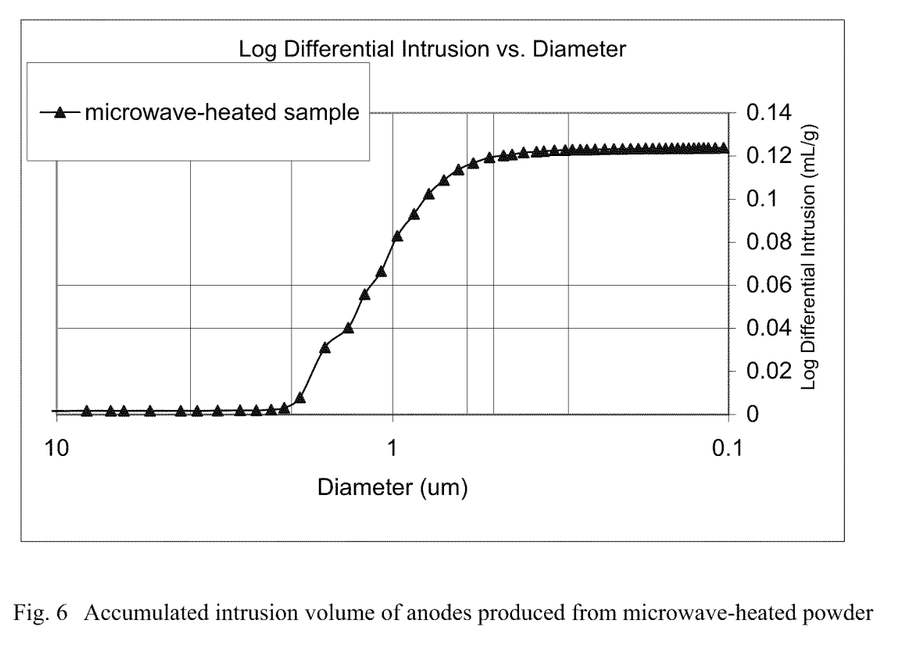
FIG. 6 is a graph of pore distribution for anodes prepared with the same tantalum powder.

The anodes pressed and sintered as described above were measured by mercury intrusion. The instrument used was an Autopore by Micromeritics Instrument Corporation. The accumulated intrusion is shown in FIG. 6.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for heat treating a chemically reduced tantalum powder having one or more of the following properties:
BET: 0.1 to 12.0 m²/g
Scott density: 15 to 40 g/inch³
Particle size as determined by SEM: 0.02 to 10 µm, and/or Fisher sub sieve size: 0.15 to 10 µm, and wherein
said method comprising heat treating said chemically reduced tantalum powder that is in a flowable state with microwave energy at a level of from about 0.5 to about 10 GHz to form an agglomerated heat-treated powder, and then crushing or milling said agglomerated heat-treated powder to form a heat-treated flowable powder that has a powder size of less than 420 microns, and wherein said heat-treated flowable powder when formed into a capacitor anode, has a higher capacitance capability compared to the same powder heat treated in a furnace.

2. The method of claim 1, further comprising deoxidizing said agglomerated heat-treated powder after said crushing or milling.

3. The method of claim 1, further comprising passivating said agglomerated heat-treated powder prior to said crushing or milling.

4. The method of claim 1, further comprising pressing said heat-treated flowable powder into a compressed body, and sintering said compressed body to form a sintered body.

5. The method of claim 4, further comprising anodizing the sintered body.

6. The method of claim 5, wherein said heat-treated flowable powder has an increase in capacitance capability of 5% or more compared to the same powder heat treated in a furnace.

7. The method of claim 5, wherein said heat-treated flowable powder has an increase in capacitance capability of from about 10% to about 30% compared to the same powder heat treated in a furnace.

8. The method of claim 1, wherein said method forms said heat-treated flowable powder that has a porosity that is 80% or more of the theoretical density of tantalum powder.

9. The method of claim 1, wherein said heat-treated flowable powder has an increase in capacitance capability of 5% or more compared to the same powder heat treated in a furnace.

10. The method of claim 1, wherein said heat-treated flowable powder has an increase in capacitance capability of from about 10% to about 30% compared to the same powder heat treated in a furnace.

11. The method of claim 1, wherein said chemically reduced tantalum powder has said BET of 0.1 to 12.0 $m^2/g$, said Scott density of 15 to 40 $g/inch^3$, said particle size as determined by SEM of 0.02 to 10 and said Fisher sub sieve size of 0.15 to 10 μm.

* * * * *